United States Patent [19]
Dias et al.

[11] Patent Number: 6,119,143
[45] Date of Patent: Sep. 12, 2000

[54] COMPUTER SYSTEM AND METHOD FOR LOAD BALANCING WITH SELECTIVE CONTROL

[75] Inventors: Daniel Manuel Dias, Mahopac; Joel Leonard Wolf, Katonah; Philip Shi-Lung Yu, Chappaqua, all of N.Y.

[73] Assignee: International Business Machines Corporation, Armonk, N.Y.

[21] Appl. No.: 08/862,047

[22] Filed: May 22, 1997

[51] Int. Cl.⁷ ........................................... G06F 13/00
[52] U.S. Cl. .................. 709/201; 709/201; 709/202; 709/203; 709/225; 709/245; 709/246; 709/247; 709/248; 709/249; 709/105; 712/29; 712/30
[58] Field of Search ............ 395/200.31, 200.32, 395/200.33, 200.56, 200.75, 200.79, 200.78, 800.29, 800.3; 709/246, 245, 249, 105, 201, 202, 203

[56] References Cited

U.S. PATENT DOCUMENTS

5,371,852 12/1994 Attanasio et al. ................. 395/200

OTHER PUBLICATIONS

Hans–Werner Brann "Web traffic characterization: an assessment of the impact of caching documents from NCSA's Web Server" pp. 37–51, V–28, 1995.

T. Brisco, "DNS Support for Load Balancing", Apr. 1995, 6 pages, Network Working Group, Rutgers University.

Daniel M. Dias et al., "A Scalable and Highly Available Web Server", (not dated), 8 pages, IBM Research Division, T.J. Watson Research Center, Yorktown Heights, N.Y. 10598, Feb. 28, 1996.

Eric D. Katz et al., "A Scalable HTTP server: The NCSA prototype", 1994, pp. 155–164, vol. 27, Computer Networks and ISDN Systems.

M. Colajanni et al., "Scheduling Algorithms for Distributed Web Servers", RC 20680 (91683) Jan. 6, 1997, Computer Science/Mathematics, Research Report, 29 pages.

*Primary Examiner*—Dung C. Dinh
*Assistant Examiner*—Hieu C. Le
*Attorney, Agent, or Firm*—Kevin M. Jordan

[57] ABSTRACT

A computerized method for load balancing in a geographically distributed or clustered system is disclosed. An arbiter assigns clients to nodes. The arbiter partitions clients into groups based on their request load. Each group is dynamically scheduled among nodes, thus avoiding high load groups from being allocated to the same node and overloading the system. If one of the nodes becomes overload, an alarm is generated, so that fewer or no new clients are allocated to the overloaded node.

11 Claims, 9 Drawing Sheets

COMPUTER SYSTEM AND METHOD FOR LOAD BALANCING WITH SELECTIVE CONTROL

CROSS-REFERENCE TO RELATED PATENT APPLICATIONS

The present application is related to copending application serial number (to be assigned) filed of even date herewith, entitled 'A METHOD FOR LOCAL AND GEOGRAPHICALLY DISTRIBUTED LOAD BALANCING USING A GENERALIZED TCP ROUTER' by Daniel M. Dias et al., application Ser. No. 08/861,749, filed May 22, 1997. (Attorney docket number YO996-225).

FIELD OF THE INVENTION

The present invention relates generally to an improved computer system and method for providing load balancing. A more particular aspect is related to a system and method for load balancing in a geographically distributed or clustered system including a set of computing nodes, a subset of which can handle a client request, and wherein an arbiter mechanism assigns sets of clients to nodes, and wherein sets of clients are categorized into groups based on an associated request load, and wherein groups are dynamically scheduled among the nodes.

BACKGROUND

The traffic on the World Wide Web is increasing exponentially, especially at popular (hot) sites. In addition to growing the capacity of hot sites by clustering nodes at that site, additional, geographically distributed (replicated) sites are often added. Adding geographically distributed sites can provide for both added capacity and disaster recovery. The set of geographically distributed, and replicated, sites are made to appear as one entity to clients, so that the added capacity provided by the set of sites is transparent to clients. This can be provided by an arbiter that assigns clients to sites. In order to support a load that increases close to linearly with the total capacity of the set of sites, it is important that the client load be balanced among the sites. Thus there is a need for methods used by the arbiter for balancing the load among the sites.

One known method in the art that attempts to balance the load among such geographically distributed replicated sites, is known as the Round-Robin Domain Name Server (RR-DNS) approach. The basic domain name server (DNS) method is described in the paper by Mockapetris, P., entitled "Domain Names—Implementation and Specification", RFC 1035, USC Information Sciences Institute, November 1987. In the paper by Katz., E., Butler, M., and McGrath, R., entitled "A Scalable HTTP Server: The NCSA Prototype", Computer Networks and ISDN Systems, Vol. 27, 1994, pp. 68–74, round-robin DNS (RR-DNS) is used to balance the node across a set of web server nodes. In this approach, the set of distributed sites is represented by one URL (e.g. www.hotsite.com); a cluster subdomain for this distributed site is defined with its subdomain name server. This subdomain name server maps client name resolution requests to different IP addresses in the distributed cluster. In this way, subsets of the clients will be pointed to each of the geographically distributed sites. Load balancing support using DNS is also described in the paper by Brisco, T., "DNS Support for Load Balancing", RFC 1974, Rutgers University, April 1995.

A key problem with RR-DNS is It may lead to poor load balance among the distributed sites, See, for example, Dias, D. M., Kish, W., Mukherjee, R., and Tewari, R., "A Scalable and Highly Available Web Server", Proc. 41st IEEE Computer Society Intl. Conf. (COMPCON) 1996, Technologies for the Information Superhighway, pp. 85–92, February 1996. The problem is due to caching of the association between name and IP address at various name servers in the network. Thus, for example, for a period of time (time-to-live) all new clients behind an intermediate name server in the network will be pointed to just one of the sites.

One known method to solve this problem within a local cluster of nodes, i.e., at a single site, uses a so-called TCP router as described in: Attanasio, Clement R. and Smith, Stephen E., "A Virtual Multi-Processor Implemented by an Encapsulated Cluster of Loosely Coupled Computers", IBM Research Report RC 18442, 1992; see also U.S. Pat. No. 5,371,852, issued Dec. 6, 1994, by Attanasio et al., entitled "Method and Apparatus for Making a Cluster of Computers Appear as a Single Host," which are hereby incorporated by reference in their entirety. Here, only the address of the TCP router is given out to clients; the TCP router distributes incoming requests among the nodes in the cluster, either in a round-robin manner, or based on the load on the nodes. As noted, the TCP router method as described in these papers only applies to a local cluster of nodes. More specifically, the TCP router can act as a proxy, where the requests are sent to a selected node, and the responses go back to the TCP router and then to the client. This proxy mode of operation can lead to the router becoming a bottleneck. Also, because of the extra network hops, both for incoming and response packets, it is not suitable for a geographically distributed environment. In another mode of operation, which we will refer to as the forwarding mode, client requests are sent to a selected node, and the responses are sent back to the client directly from the selected node, bypassing the router. In many environments, such as the World Wide Web (WWW) the response packets are typically much larger than the incoming packets from the client; bypassing the router on this response path is thus critical. However, the TCP router method In forwarding mode, only applies to a cluster of nodes that are connected directly to the router by a LAN or a switch, i.e., the nodes in the multi-node cluster cannot be geographically remote, or even on a different sub-net. The reason is that lower level physical routing methods are used to accomplish this method.

Thus there is a need to provide a method for better load balancing among geographically distributed sites.

SUMMARY

In accordance with the aforementioned needs, the present invention is directed to an improved system and method for load balancing among geographically distributed sites.

Another aspect of the present invention provides an improved system and method for geographical load balancing in the Internet and the World Wide Web.

Yet another aspect of the present invention minimizes the overhead for load balancing as compared to that for serving the client requests These and further advantages are achieved by this invention by identifying sources with heavy client loads, and those with lighter loads. More generally, several load tiers may be identified, each with a comparable load. Each of the tiers are then scheduled separately, so as to better balance the load among the nodes. Further, if one of the nodes becomes overloaded, an alarm may be generated, so that fewer (or no) new clients are allocated to the overloaded node.

More specifically, a method in accordance with the present invention includes the following: As outlined above, the basic problem with the RR-DNS approach is that gateways/fire-walls/name-servers cache the name to IP address mapping, and all the new requests from behind a gateway are mapped to the same server site for a so-called time-to-live. (TTL) period. We will refer to the load arriving from behind the gateway during the TTL period as the hidden load. The basis of the disclosed method is to estimate the hidden load, and to perform the name to IP address mapping based on the estimated hidden load. Gateways are assigned to tiers based on the hidden load. Requests from each tier are mapped to sites using a round robin technique. The basic idea in this technique is to distribute the load from gateways with comparable hidden load among the sites; this leads to better distribution of the hidden load among sites.

BRIEF DESCRIPTION OF THE DRAWINGS

These, and further, objects, advantages, and features of the invention will be more apparent from the following detailed description and the appended drawings, wherein.

DETAILED DESCRIPTION

Figure 1A:
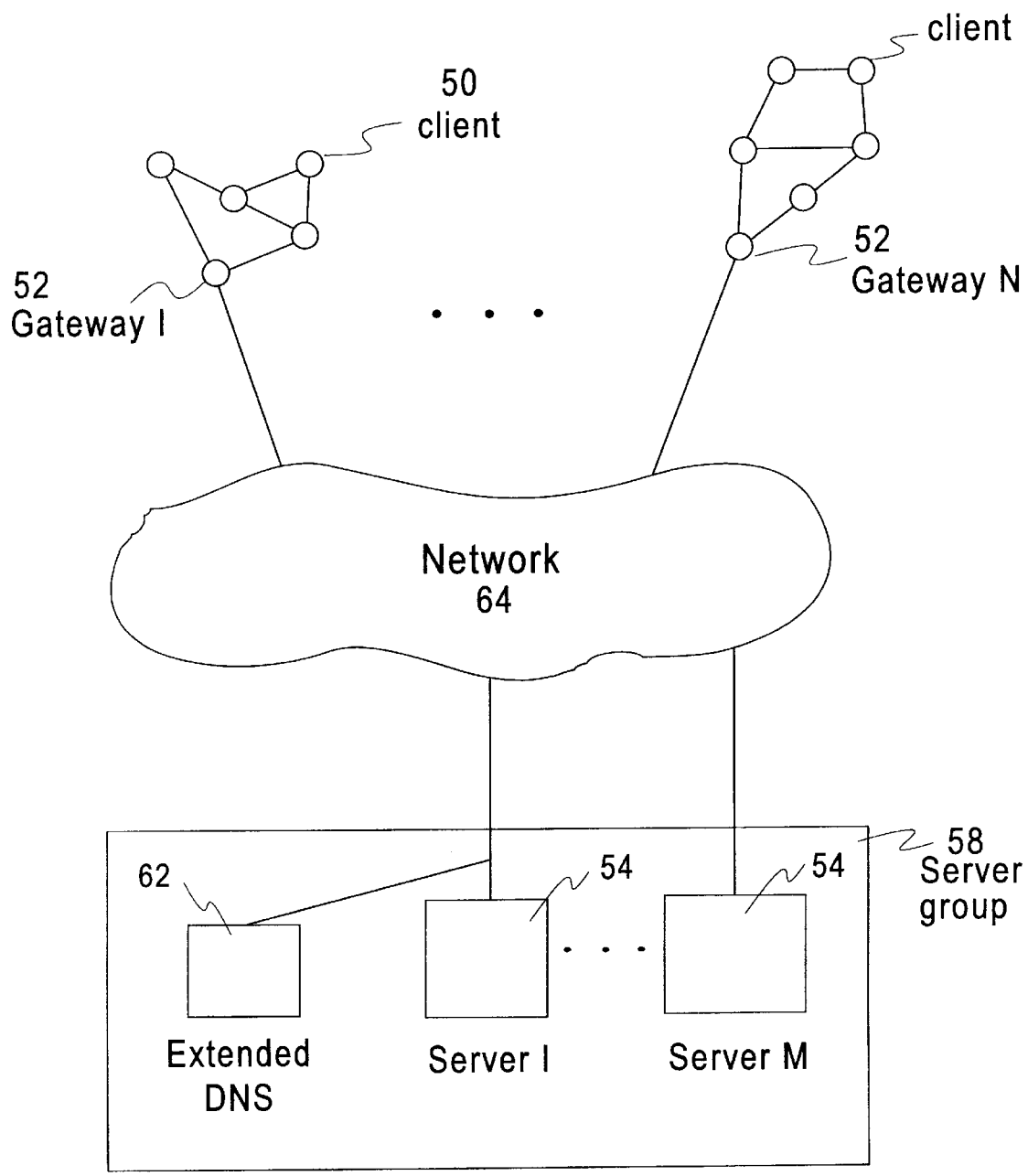
FIG. 1A is a diagram of an Internet network having features of the present invention.

FIG. 1A depicts a block diagram of the Internet including features of the present invention. As depicted, Client workstations or personal computers (PCS) 50 are connected through a common gateway 52 to the network 64. Communications utilize the TCP/IP suite of protocols. Clients 50 request services from one or more servers 54 which are also connected to the network 64. Typical service requests include world-wide-web (WWW) page accesses, remote file transfers, electronic mail, and transaction support. For certain services, more than one server may be required, forming a service group (58), to handle the high traffic requirement. These servers may be Gus located at geographically distinct locations. In any event, the existence of the multiple servers is transparent to the clients 50. Clients issue service requests based on a logical or symbolic name of the server group. This can be provided by a conventional domain name server (DNS) which maps the logical or symbolic name into the physical or IP address of one of the server nodes 54 in the server group 58. This is done through a mapping request from the clients to the DNS. The mapping requests are thus distinct from the service requests which are issued from the clients to the servers. To reduce network traffic, this mapping request is typically not issued for each service request. Instead, the result of the mapping request is cached for a time-to-live. (TTL) period. Subsequent service requests issued during the TTL period will follow the result of the previous mapping and hence be routed to the same server node. According to the present invention, an "extended DNS" 62 provides improved load balance of client 50 service requests among servers 54 in the server group 58.

Figure 1B:
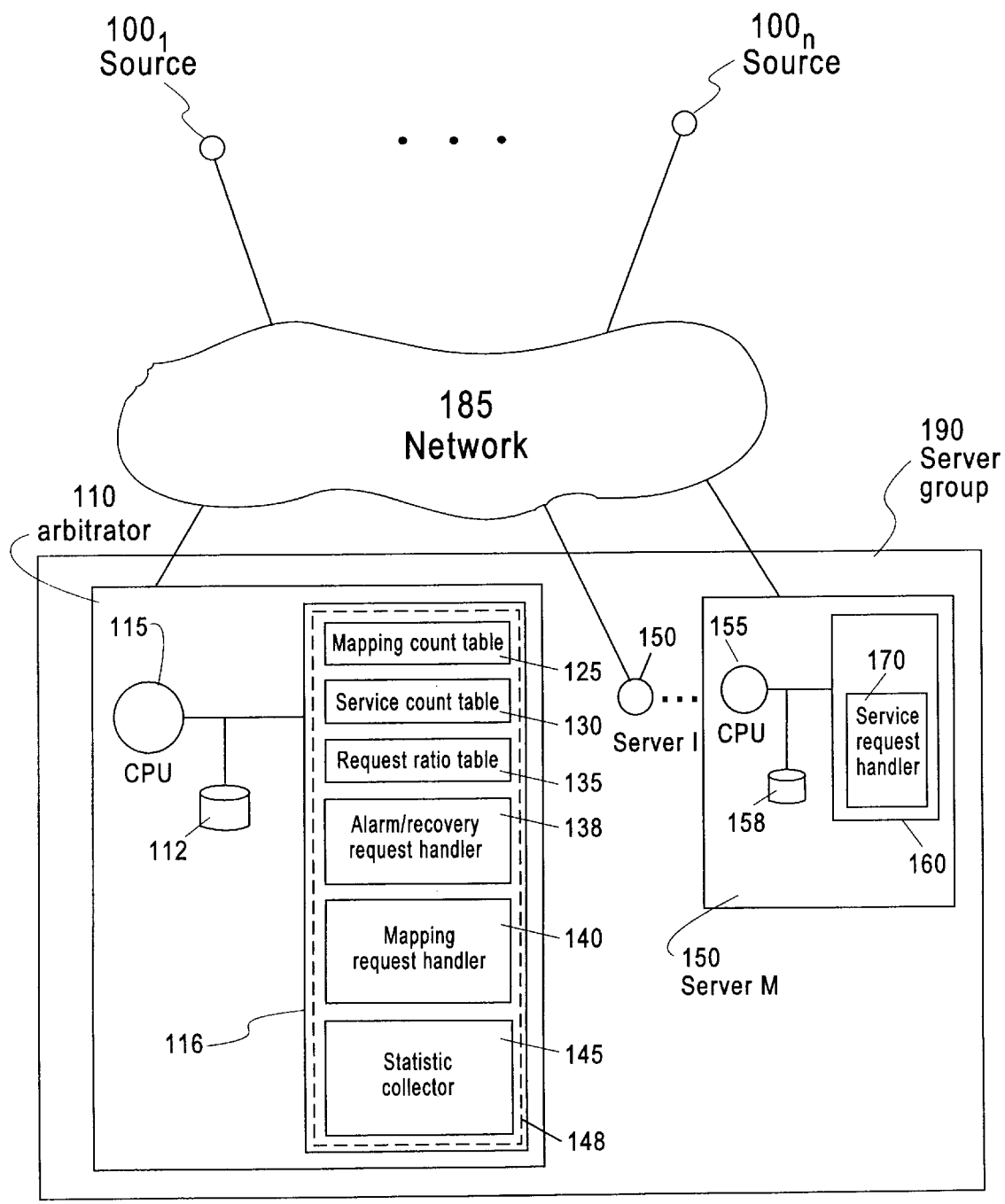
FIG. 1B is a diagram of a generalized network having features of the present invention.

FIG. 1B depicts a generalized network having features of the present invention. As depicted, a source (100) represents any computing node that can issue mapping and service requests, and arbitrator (110) represents any computing node that can schedule a mapping request to one of the sever nodes (150). FIG. 1A, based on an Internet, is a special case of FIG. 1B wherein the arbitrator (140) corresponds to the extended DNS (62). The arbitrator consists of CPU (115), memory (116) and storage devices (112). A two-tier round robin scheduler (148) is employed by the arbitrator to assign/schedule mapping requests to one of the server nodes. The scheduler is preferably implemented as computer executable code stored on a computer readable storage device (112) such as a magnetic or optical disk or other stable storage medium. As is conventional, the schedule? is loaded into memory (116) for execution on CPU (115). Those skilled in the art will appreciate that a generalization to multi-tier (greater than two) round robin is straightforward.

The round robin scheduler (148) includes several components: an alarm/request handler (138), a mapping request handler (140), and a statistic collector (145). These components are explained in details in FIG. 3, 4 and 6, respectively. Several data structures, i.e., the mapping count table (12), service count table (130), and the request ratio table (135) are also maintained. The operations on these data structures will be explained with the round robin scheduler components. The server node (150) can be any computing node that can handle service requests from the sources (100), such as providing data/object accesses, file transfers, etc. The server node (150) consists of CPU (155), memory (160) and storage devices (158). The server node executes a service request handler (170) to process the service requests as detailed in FIG. 7.

Referring again to FIG. 1B, let N denote the number of sources 100 and M denote the number of servers 150. Let GW(I,j) be the number of service requests from source 100$n$ to server 150$j$ in an interval of given length, I and GD(I) be the number of mapping requests in the same interval from the source 100$n$ to an arbitrator 110 having features of the present invention. The service table (130) can be represented by GW((ij), 0<I<N+1.0<j<M+1, and the mapping count table (125) can be represented by GD(I), 0<I<N+1. Then let DW(I) be the average number of service requests from the source 100$n$ per mapping request. The request ratio table (135) can be represented by DW(I), 0<I<N+1. Recall that DW(I) was earlier referred to as the "hidden" load of each gateway in the Internet context.

Figure 2:
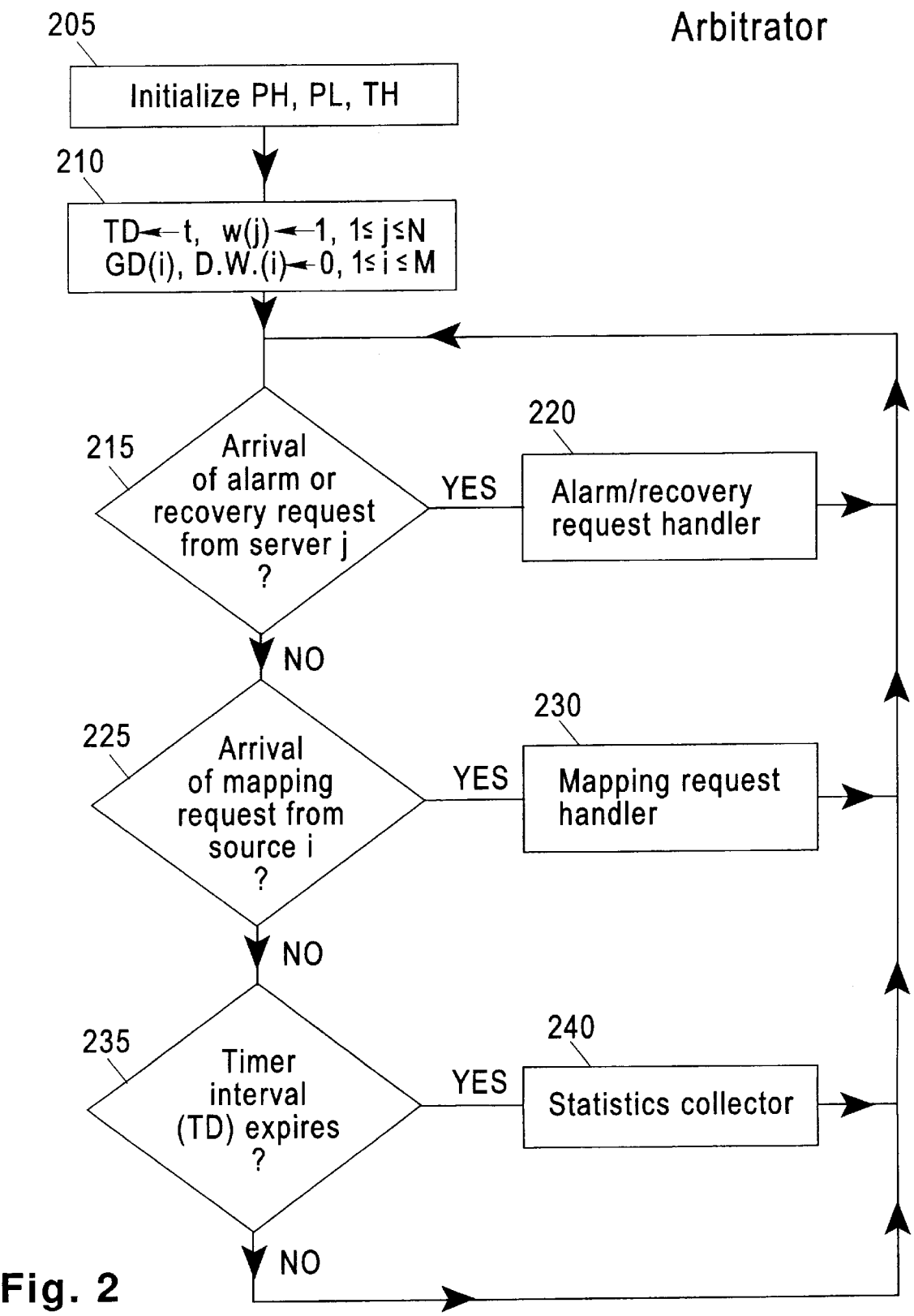
FIG. 2 is an overall block diagram of a preferred embodiment of the arbitrator.

FIG. 2 shows an example of a logic diagram for the arbitrator 110 using a 2-tier round robin process in accordance with the present invention. The two-tier round robin scheduler (148) partitions its sources into two groups. In the Internet context, the sources become gateways 52. The server assignment for mapping requests from the different groups are handled separately in round robin order. In other words, each source group is handled as a separate and independent round robin tier.

For example, assume there are six sources A, B, C, D, E and F and three servers 1, 2, and 3. Furthermore, A and D are in one group (the first tier) and B, C, E and F are in the other group (the 2nd tier). The 2-tier round robin scheme assigns/ schedules mapping requests from A and D (similar for requests from B, C, E and F) in round robin order to the servers with no regard to the requests and assignment of the other group. Assume the mapping request stream arriving at the arbitrator 110 consists of requests from A, B, E, F, A, D, B, C, E, . . . . Furthermore, assume that the two-tier round robin starts the 1st tier at server 1 and 2nd tier and server 3. Then, the server assignment for the mapping request stream will be 1, 3, 4, 1, 2, 3, 2, 3, 4, . . . . This is because the input substream belonging to the 1st tier consists of A, A, and D, i.e. the 1st, 5th and 6th elements of the request stream. These requests get assigned to server 1, 2 and 3, in round robin order. Similarly, the input substream belonging to the 2nd tier consists of B, E, F, B, C, E, i.e. the 2nd, 3rd, 4th, 7th, 8th, and 9th elements of the request streams. These requests get assigned to server 3, 4, 1, 2, 3, 4, in round robin order. The 2-tier round robin scheduler (148) maintains two indices PH and PL on the last server assignments in round robin order for the two tiers, respectively. The scheduler increments (modulo the number of servers) the value of PH for selecting the server for the next assignment of mapping requests from the 1st tier source group. Similarly, it increments (modulo the number of servers) the value of PL for selecting the server for the next assignment of the requests from the 2nd tier source group. In the previous example, at the end of the processing of the stream requests, the value of PH (for the first tier) is 3 and the value of PL (for the second tier) is 4, where the initial values before the processing are 4 and 1, respectively.

Referring again to FIG. 2, in step 205, the parameters, PH and PL, are initialized. That is to say for the first tier, the round robin starts searching for the next server assignment after PH which is not overloaded; and for the second tier the round robin starts searching for the next server assignment after PL which is not overloaded. One can choose the initial value for PH to be 1 and that for PL as close to one half of I. This staggers the two tiers. Also a load level threshold (TH) is initialized for determining the tier classification. As an example, TH can be chosen as half of the average service requests per mapping request over all sources. A source 100 with an estimated (hidden) load (i.e. DW(I)) higher than TH will be assigned to the 1st tier group and the source 100n with an estimated (hidden) load (DW(I)) less than TH will be assigned to the 2nd tier group.

In step 210, a timer interval (TD) which triggers the collection of statistics is set to t, say 5 minutes. An array W(j), 0<J<N+1, is set to 1, and arrays GD(I) and DW(I), 0<I<M+1, are set to zero. The arbitrator 110 then repeatedly checks for input. In step 215, upon detection of the arrival of an alarm/recovery request from one of the servers 150j, the arbitrator 110 executes the alarm/recovery request handler 138, in step 220. Details of the alarm/recovery request handler will be described with reference to FIG. 3. In step 225, if a mapping request a from source 100n (0<I<N+1) is detected, the arbitrator 110 invokes the mapping request handler 140, in step 230. Details of the mapping request handler will be described with reference to FIG. 4. In step 235, if the expiration of the statistic collection timer interval (TD) is detected, the arbitrator 110 executes the statistic collector routine 145, in step 240. Details of the statistic collector routine will be described with reference to FIG. 6.

Figure 3:
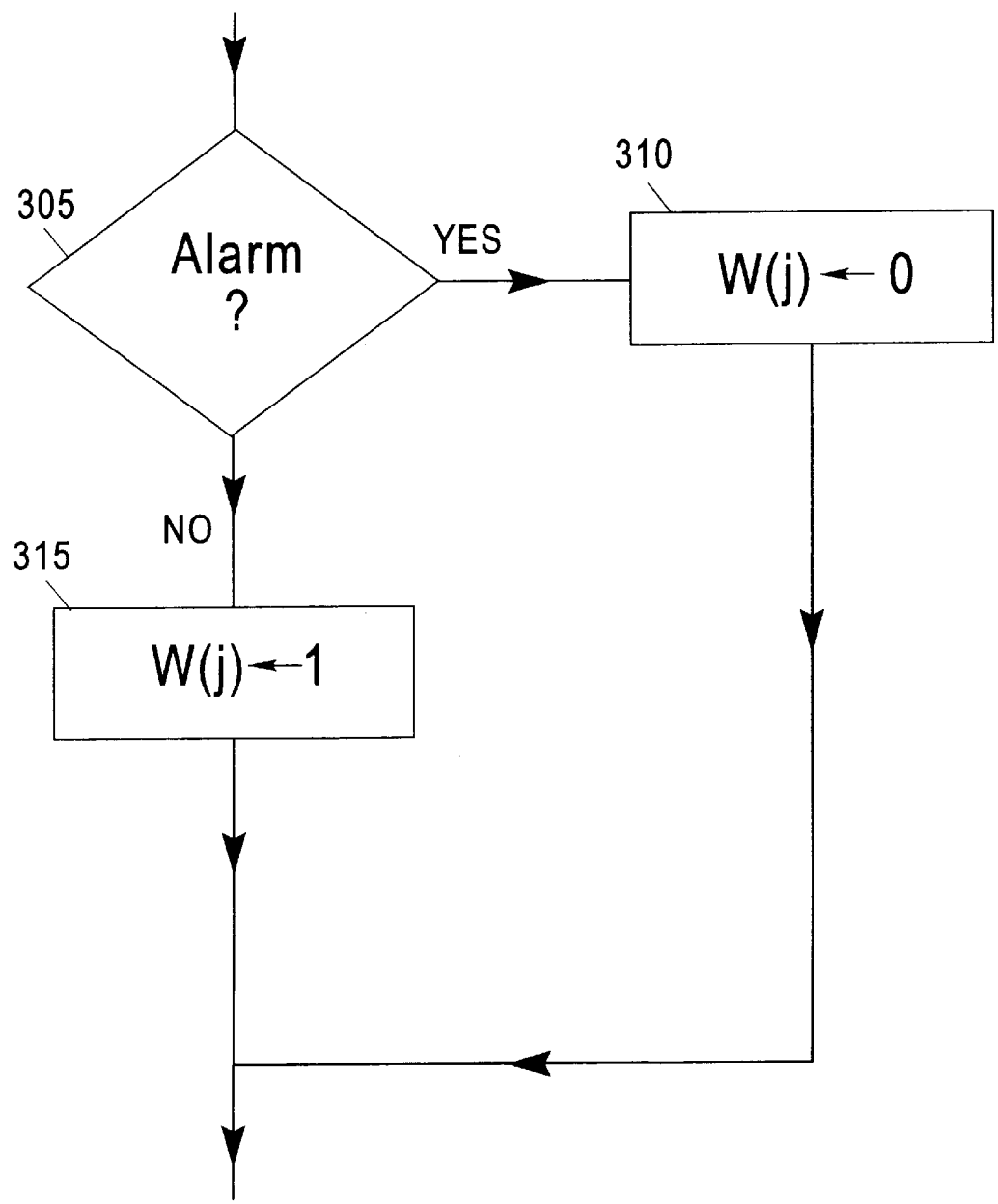
FIG. 3 is a flow chart of the alarm/recovery request handler of the arbitrator.

FIG. 3 shows an example of the alarm/recovery request handler logic. In step 305, the request type is checked to determine whether it is an alarm request. If it is found to be an alarm request, in step 310, W(j) is set to zero to indicate that server 150j is in an overloaded state. Otherwise in step 315, a recovery request is received and, W(j) is set to 1.

Figure 4:
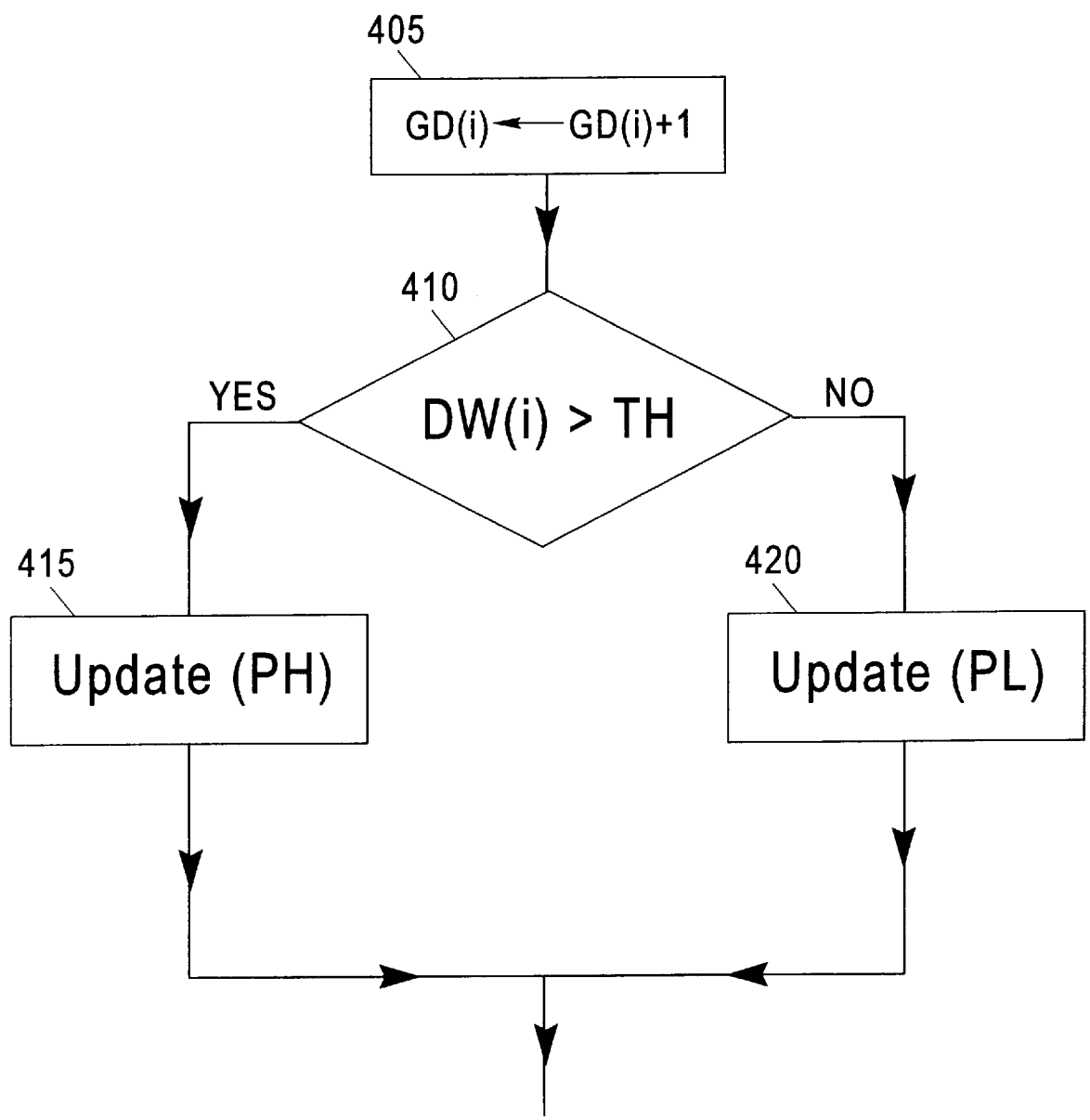
FIG. 4 is a flow chart of the mapping request handler of the arbitrator.

FIG. 4 shows an example of the mapping request handler. It determines the tier group of the source request and then performs the server assignment (i.e. mapping name to IP address in the Internet application) using a round robin method according to the tier of the source group. In step 405, the in mapping count table 125 GD(I) is incremented by 1. In step 410, the load (including any hidden load) associated with the source is used to determine its group/tier for the round robin. Specifically, DW(I) is tested to determine which tier of the round robin the source 100n belongs to. In step 415, if DW(I) is larger than the load level threshold TH, it means the source belongs is to the first tier group. The "update" function (in FIG. 5) is invoked to determine the server selection (i.e. the mapping of the name to an IP address) where the function parameter (p) representing the index of the last server assignment for the tier group under consideration is set to PH. Otherwise, the source belongs to the 2nd tier group and in step 420 when the function "update" is invoked to determine the server selection for the 2nd tier group, the function parameter (p) representing the index of the last server assignment for the 2nd tier group is set to PL.

Figure 5:
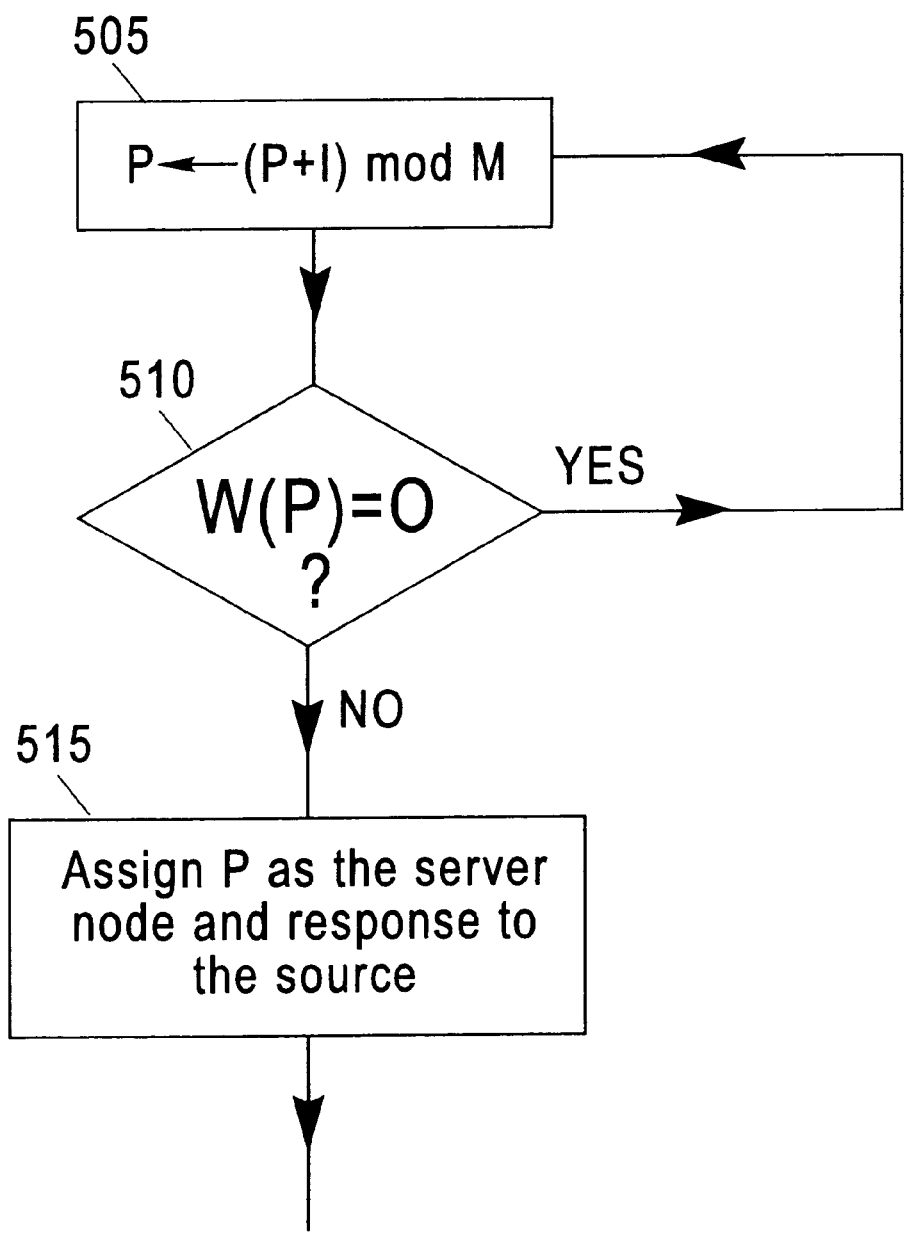
FIG. 5 is a flow chart of the update routine used by the mapping request handler.

FIG. 5 depicts an example of the update function of steps 415 and 420. The update function is invoked with a parameter (p) which represents the last server assignment for the tier group of the source request. As depicted, in step 505, the parameter p is incremented and moduloed by M. In step 510, the state of the server 150j is tested for overloading. If W(p) is not equal to zero, server p is selected and the source 100n is notified of the selection, in step 515. If in step 510, W(P)=0, step 505 is repeated to generate another candidate server.

Figure 6:
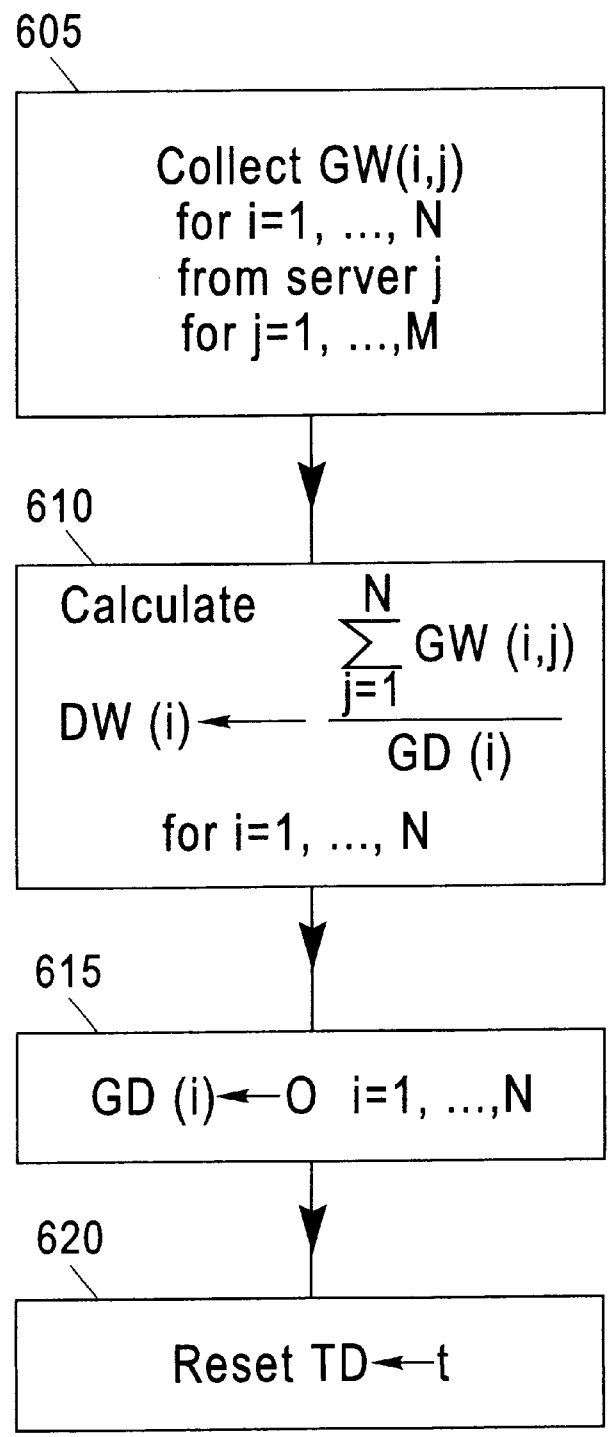
FIG. 6 is a flow chart of the statistic collector of the arbitrator.

FIG. 6 shows an example of the statistics collector. As depicted, in step 605, the arbitrator 110 collects the number of service requests GW(I,j), 0<I<N+1, from each server 150j, . . . 150n. This can be done by explicitly sending a message for the requested information. In step 610, After collecting the information from all servers DW(I), the average number of service requests per mapping request GD(I) from source 100n, is calculated. In step 615, GD(I) is reset to zero. Finally, in step 620, the timer interval (TD) is reset to t.

Figure 7:
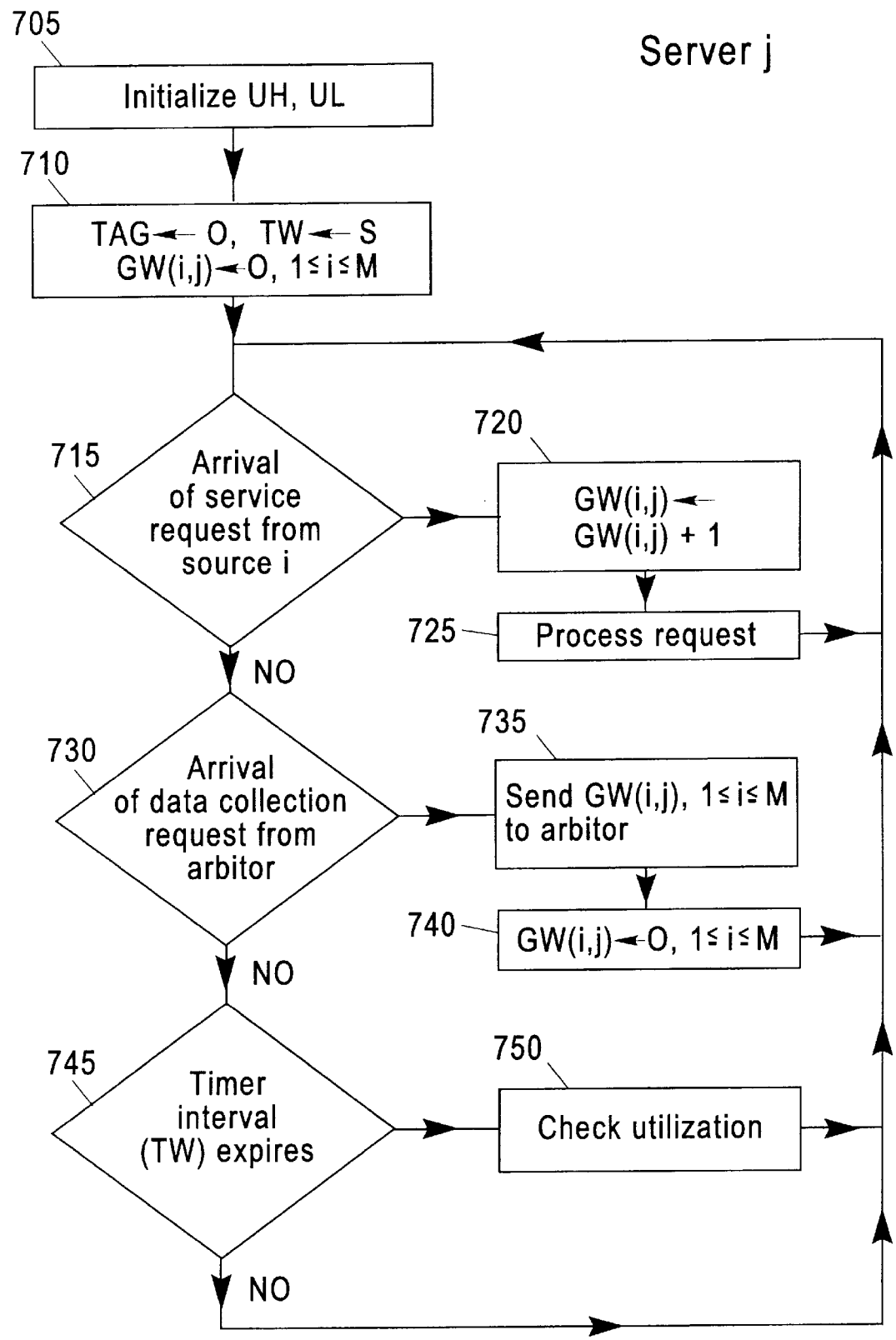
FIG. 7 is a flow chart of an embodiment of the server.

FIG. 7 depicts an example of a logic flowchart for a server 150j processing requests in accordance with the present invention. As depicted, in step 705, two utilization thresholds, representing overloading (UH) and returning to normal (UL), are initialized. For example, one can choose UH to be 90 percent utilization and UL to be 70 percent utilization. In step 710, service request array GW(I,j), for 0, I<M+1, is initialized to zero. Also, a utilization timer interval (TW) for checking utilization is initialized to s, say 1 minute, and a state variable (TAG) is set to zero. Note that TAG is set to zero when the server is determined to be overloading. Server 150j then repeatedly checks for input. In step 715, upon detection of the arrival of a service request from source 100n, GW(I,j) is incremented in step 720 and the service request is processed by the service request handler 170, in step 725. In step 730, if a data collection request from the arbitrator 110 is detected, server 150j sends GW(i,j) for 0<I<M+1, to the arbitrator 110, in step 735 and sets GW(I,j), for 0<I<M+1, to zero, in step 740. In step 745, if the expiration of the utilization timer interval (TW) is detected, the server 150j executes a check utilization logic, in step 750. An example of the check utilization logic will be described in FIG. 8.

Figure 8:
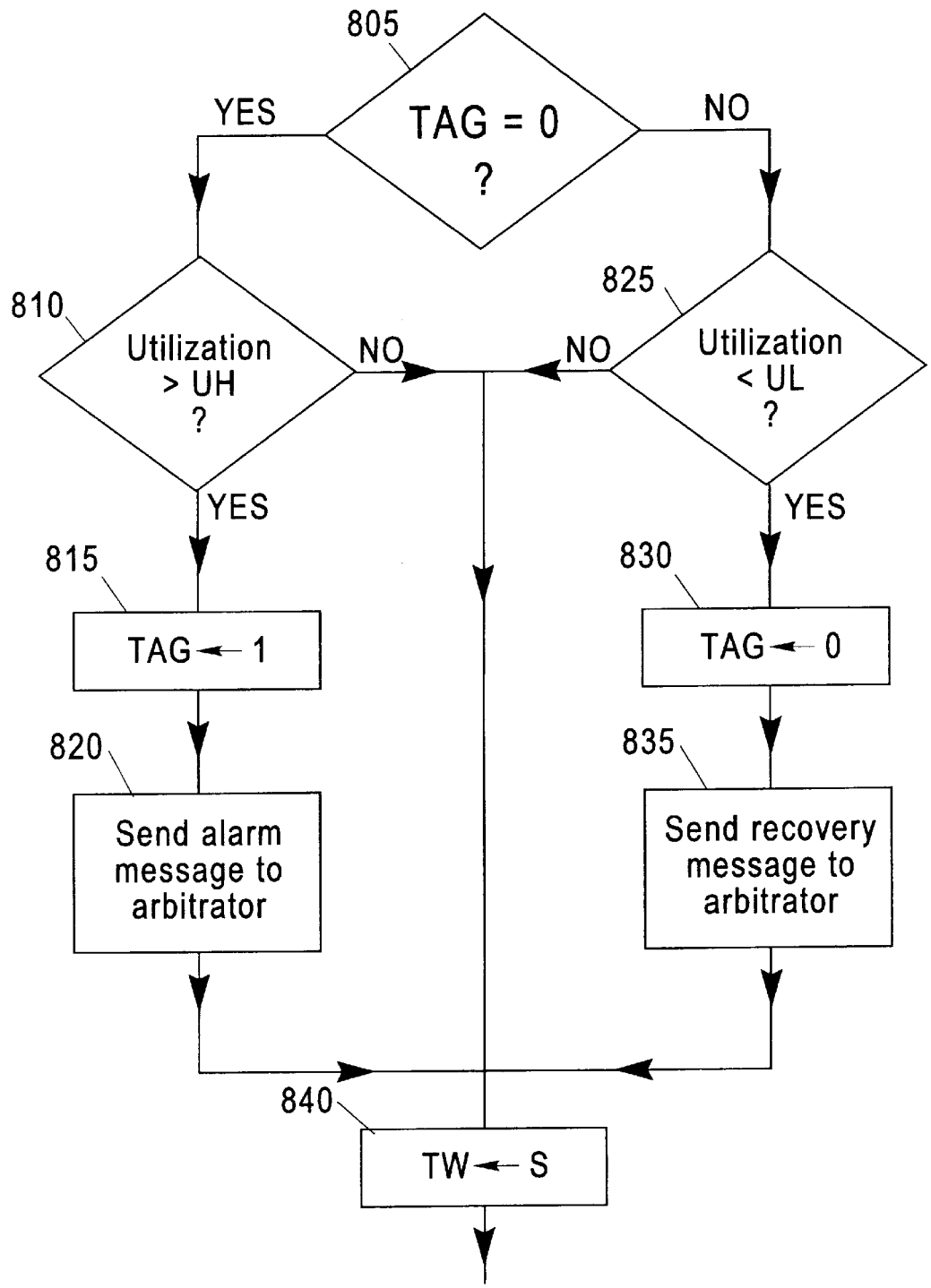
FIG. 8 is a flow chart of the check utilization routine used by the server.

FIG. 8 depicts an example of the check utilization logic of step 750. As depicted, in step 805, the server state variable, (TAG) is checked. If TAG is equal to zero, in step 810 the server utilization is checked. In step 815, if the utilization exceeds the overload threshold (UH), TAG is set to one and in step 820, an alarm message is sent to the arbitrator 110. In step 840, the utilization (TW) timer interval is reset to s. In step 810, if the server utilization is less than threshold UH, step 840 is executed. In step 805, if TAG does not equal zero, in step 825, the utilization of the server is checked. If the utilization is returning to normal, i.e., less than threshold UL, in step 830, TAG is set to zero. In step 835, a recovery (to normal) message is then sent to the arbitrator 110.

Those skilled in the art will readily appreciate that various extensions to the disclosed scheme can be used. For example: The case with two tiers is described in the embodiment above. Alternatively, partitioning the tiers using percentiles of the hidden load could be used. Another technique is to use recursive partitioning starting with the mean, and recursively resplitting the tier having the higher load. A weighted round robin technique within each tier can be used with weights based on the capacity of each site. This would handle heterogeneous or clustered sites having different CPU MIPS or numbers of CPUs.

Another extension is to stagger the round robin assignments among tiers, such that different tiers start at different sites. Another extension is to use different round robin orders among the different tiers, to avoid convoy effects where the different tiers move together because of similar TTLs. For instance, a pseudo random round robin order for each tier could be used.

Another extension is to use threshold based alarms based on the load at individual sites; if the load at a site crosses a pre-defined threshold, the weight of the site can be reduced, or the weight can be set to zero thus eliminating the site from consideration. A second threshold can be used such that the site gets back its normal weight when the load falls below a lower threshold. Various other extensions to the disclosed method can be used and are considered to be in the spirit and scope of this invention.

We claim:

1. In a multi-node server environment wherein client requests can be satisfied by routing a client request to any server, and wherein clients are divided into groups, and wherein client groups periodically send requests to an arbitrator, a computerized method employed by the arbitrator for assigning a server to service some or all of the requests from a client group, comprising the steps of:

estimating a load, associated with the requests from client groups to an assigned server node;

partitioning client groups into tiers, in response to said step of estimating a load; and for each tier, separately scheduling the client groups to the assigned server node.

2. The method of claim 1 wherein each of the multi-node servers are web servers at geographically distributed sites, wherein the arbitrator comprises an extended domain name server (DNS), and wherein the client group consists of the set of clients behind a common gateway or SOCKS server, the method comprising the steps of:

said estimating step including estimating the hidden load behind each gateway;

said partitioning step including assigning gateways to the tiers; and said scheduling step comprising mapping name requests to IP addresses using a separate round robin method for each tier.

3. The method of claim 2, wherein said estimating step comprises the step of estimating the hidden load behind the gateway as a ratio of a total number of page requests from the gateway to web server sites, to a number of name server requests from the gateway.

4. The method of claim 2, wherein a different round robin order is used for each tier.

5. The method of claim 2 wherein said partitioning step comprises partitioning the gateways into two tiers wherein a first tier includes gateways having more than a mean hidden load, and a second tier includes remaining gateways.

6. The method of claim 5, further comprising the step of recursively splitting at least one of the tiers are according to the mean load within that tier.

7. The method of claim 4 wherein the round robin order for each tier is pseudo-random.

8. The method of claim 2 wherein the round robin order for different tiers is staggered, with different sites as starting points.

9. The method of claim 8 wherein a load threshold is used, further comprising the steps of:

detecting if the load at a site exceeds the threshold; and reducing the weight of one or more of the tiers for the site exceeding the threshold.

10. The method of claim 9, further comprising the step of:

said reducing step including reducing the weight to zero for the site exceeding the threshold;

detecting if the load at a site having zero weight has fallen below a second threshold; and increasing the weight of the site detected to have fallen below the second threshold.

11. The method of claim 1 wherein, in said scheduling step further comprises the step of assigning each tier using a round-robin assignment.

* * * * *